United States Patent [19]

Moczygemba et al.

[11] Patent Number: 5,399,628

[45] Date of Patent: Mar. 21, 1995

[54] BLOCK COPOLYMERS OF MONOVINYLARENES AND CONJUGATED DIENES CONTAINING TWO INTERIOR TAPERED BLOCKS

[75] Inventors: George A. Moczygemba, Bartlesville; Nancy R. Knight, Ochelata; William J. Trepka; Nathan E. Stacy, both of Bartlesville, all of Okla.

[73] Assignee: Phillips Petroleum Company, Bartlesville, Okla.

[21] Appl. No.: 162,735

[22] Filed: Dec. 2, 1993

[51] Int. Cl.$^6$ .............................................. C08F 297/04
[52] U.S. Cl. ............................. 525/314; 525/250; 525/271; 525/89
[58] Field of Search ............... 525/314, 271, 250, 89

[56] References Cited

U.S. PATENT DOCUMENTS

| | | | |
|---|---|---|---|
| 4,704,434 | 11/1987 | Kitchen et al. | 525/250 |
| 5,130,377 | 7/1992 | Trepka et al. | 525/314 |
| 5,227,419 | 7/1993 | Moczygemba et al. | 524/138 |
| 5,256,736 | 10/1993 | Trepka et al. | 525/314 |
| 5,290,875 | 3/1994 | Moczygemba et al. | 525/314 |
| 5,319,033 | 6/1994 | Trepka et al. | 525/314 |

*Primary Examiner*—James J. Seidleck
*Assistant Examiner*—M. L. Warzel
*Attorney, Agent, or Firm*—Cynthia L. Stokes

[57] ABSTRACT

A method for preparing tapered block copolymers in a polymerization process by sequentially charging: (1) an initiator and monovinylaromatic monomer in the presence of a randomizer; (2) an initiator and monovinylaromatic monomer; (3) a mixture of monovinylaromatic and conjugated diene monomers; (4) a mixture of monovinylaromatic and conjugated diene monomers; (5) conjugated diene monomer; and (6) a coupling agent; and the polymodal tapered block copolymers prepared thereby. The copolymers are particularly useful neat or in blends for applications such as packaging and food or drink containers which require transparency and good environmental stress crack resistance.

25 Claims, No Drawings

BLOCK COPOLYMERS OF MONOVINYLARENES AND CONJUGATED DIENES CONTAINING TWO INTERIOR TAPERED BLOCKS

FIELD OF THE INVENTION

This invention relates to tapered block copolymers of monovinylarenes and conjugated dienes and methods of preparation of these tapered block copolymers.

BACKGROUND OF THE INVENTION

There has developed in the polymer field, and especially in the packaging and related industries, a need for thermoplastic polymers that can be formed into transparent articles having high impact strength with good environmental stress crack resistance. There are needs for polymers which are useful as single components as well as for use in blends to improve properties of articles made from other commonly used polymers. The polymers satisfying these needs should be suitable for use with conventional extrusion, injection and blow molding equipment and also suitable for use in other methods of forming plastics into containers, tubes, films, fibers, and the like. Polystyrene, high impact polystyrene, branched block copolymers, and the like have been developed to meet these criteria with various degrees of satisfaction.

Much effort has been directed to the preparation of substantially transparent block copolymer resins with a variety of block structures produced by a variety of monomer addition sequences and a variety of coupling agents.

Polymerization of styrene and butadiene with organolithium initiators to produce block copolymers in which one or more non-elastomeric polymer blocks are bonded to one or more elastomeric polymer blocks has been disclosed. Block copolymers have been formed by sequential charges of the monomers, sometimes followed by introduction of one or more coupling agents into the reaction. Tapered blocks in styrene/butadiene block copolymers have been prepared by simultaneous charging of monomers to the polymerization zone. Literally thousands of various combinations of sequences of charges of monomers and coupling agents are possible.

One problem encountered in making monovinylaromatic-conjugated diene block copolymers is control of the exothermic reaction temperatures and pressure which can rapidly reach high peaks if large monomer charges are made in order to produce large blocks in the copolymers.

SUMMARY OF THE INVENTION

It is an object of this invention to provide improved resinous tapered block copolymers of vinyl-substituted aromatic hydrocarbons and conjugated dienes which can be used neat or in blends to make articles with improved environmental stress crack resistance and good impact strength.

A further object of this invention is to provide a process for making resinous tapered block copolymers of vinyl-substituted aromatic hydrocarbons and conjugated dienes. One purpose of this process is to avoid difficult-to-control temperature and pressure extremes while producing monovinylaromatic/conjugated diene tapered blocks in copolymers with desirable properties.

In a preferred embodiment the inventive copolymers are prepared under solution polymerization conditions in a reaction zone by:

(a) charging a monovinylaromatic monomer and an initiator in the presence of a randomizer and allowing polymerization to occur until essentially no free monomer is present; thereafter (b) charging an initiator and a monovinylaromatic monomer and allowing polymerization to occur until essentially no free monomer is present; thereafter (c) charging a mixture of monovinylaromatic monomer and conjugated diene monomer and allowing polymerization to occur until essentially no free monomer is present; thereafter (d) charging a mixture of monovinylaromatic monomer and conjugated diene monomer and allowing polymerization to occur until essentially no free monomer is present; thereafter (e) charging a conjugated diene monomer and allowing essentially complete polymerization to occur until essentially no free monomer is present; and thereafter (f) charging the reaction mixture with a coupling agent.

DETAILED DESCRIPTION OF THE INVENTION

We have discovered improved monovinylaromatic/conjugated diene tapered block copolymers which can be used neat or blended with polymers of styrene to produce resins which can be formed into articles with improved environmental stress crack resistance and good impact strength.

The polymers of this invention are characterized as resinous, non-rubbery polymodal block copolymers of at least one conjugated diene with at least one monovinylarene, having at least two random-tapered blocks and are prepared so that, when the choice of coupling agent permits, at least a portion of the final product is of a branched, coupled character.

The polymers prepared according to this invention contain from about 55 to about 95, preferably from about 60 to about 90, more preferably from about 65 to about 85, weight percent of copolymerized monovinyl substituted aromatic hydrocarbon monomer based on the weight of total monomers employed. Correspondingly, the inventive copolymers contain from about 45 to about 5, preferably from about 40 to about 10, and more preferably from about 35 to about 15 weight percent copolymerized conjugated diene monomer based on the total weight of monomers in the copolymer.

The coupled portions of the resinous polymodal block copolymers of this invention have terminal polymonovinylarene blocks on the extending arms of each linear or radial copolymer molecule, and further contain at least two central internal tapered blocks of monovinylarene and conjugated diene. The resinous copolymeric polymodal products also contain portions of linear uncoupled block copolymers of poly(monovinylarene)/poly(conjugated diene); the linear uncoupled block copolymer content is considered to be an important portion of the resinous product with respect to its overall properties.

Components

The process of this invention can be carried out with any of the organomonoalkali metal compounds of the formula RM wherein R is an alkyl, cycloalkyl or arylcarbanion containing 4 to 8 carbon atoms and M is an alkyl metal cation. The presently preferred initiators are alkylmonolithium compounds, especially n-butyllithium or sec-butyllithium.

The conjugated diene monomers which can be used contain 4 to 6 carbon atoms and include 1,3-butadiene, 2-methyl-1,3-butadiene, 2-ethyl-1,3-butadiene, 2,3-dimethyl-1,3-butadiene and 1,3-pentadiene and mixtures thereof. Each of the charges containing conjugated diene in the same sequence of charges may be the same, but are not necessarily the same, conjugated dienes or the same mixtures of conjugated dienes. Presently preferred conjugated diene monomer is 1,3-butadiene.

The monovinylaromatic monomers which can be used contain 8 to 12 carbon atoms and include styrene, alpha-methylstyrene, 4-methylstyrene, 3-methylstyrene, 2-methylstyrene, 4-ethylstyrene, 3-ethylstyrene, 2-ethylstyrene, 4-tert-butylstyrene, 2,4-dimethylstyrene and condensed aromatics such as vinyl napthalene and mixtures thereof. Each of the charges containing monovinylaromatic monomer in the same sequence of charges may be the same but are not necessarily the same, monovinylaromatic monomer or mixture of monovinylaromatic monomers. The presently preferred monovinylaromatic monomer is styrene.

Examples of polar compounds which can be advantageously employed as randomizers and promoters of initiation in this invention are ethers, thioethers (sulfides) and tertiary amines. It is usually preferred to use ethers and sulfides in which the radicals attached to the oxygen or sulfur atoms are hydrocarbon radicals. Specific examples of such polar materials include dimethyl ether, diethyl ether, ethyl methyl ether, ethyl propyl ether, di-n-propyl ether, di-n-octyl ether, anisole, dioxane, 1,2-dimethoxyethane, dibenzyl ether, diphenyl ether, 1,2-dimethoxybenzene, tetramethylene oxide (tetrahydrofuran), potassium alkoxide, dimethyl sulfide, diethyl sulfide, di-n-propyl sulfide, di-n-butyl sulfide, methyl ethyl sulfide, dimethylethylamine, tri-n-propylamine, tri-n-butylamine, trimethylamine, triethylamine, tetramethylethylenediamine, tetraethylethylenediamine, pentamethyl-diethyleneamine, N,N-di-methylaniline, N-methyl-N-ethylaniline, N-methylmorpholine, and the like. Mixtures of these polar compounds also can be employed in the practice of the present invention. Presently preferred are either tetrahydrofuran or diethyl ether.

Among the suitable coupling agents are the di- or multivinylaromatic compounds, di- or multiepoxides, di- or multiisocyanates, di- or multiimines, di- or multialdehydes, di- or multiketones, alkoxytin compounds, di- or multihalides, particularly silicon halides and halosilanes, mono-, di-, or multianhydrides, mono-, di-, or multiesters, preferably the esters of monoalcohols with polycarboxylic acids, diesters which are esters of monohydric alcohols with dicarboxylic acids, lactones, and the like, including compounds containing two or more groups and mixtures of two or more compounds.

Examples of suitable vinylaromatic coupling agents include, but are not limited to, divinylbenzene, 1,2,4-trivinylbenzene, 1,3-divinylnaphthalene, 1,3,5-trivinylnaphthalene, 2,4-divinylbiphenyl, p-diisopropenylbenzene, and the like. Of these, the divinylaromatic hydrocarbons are preferred, particularly divinylbenzene in either its ortho, meta, or para isomer. Commercial divinylbenzene which is a mixture of the three isomers and other compounds is satisfactory.

Epoxidized hydrocarbon polymers such as epoxidized liquid polybutadiene and epoxy compounds such as 1,2; 5,6; 9,10-triepoxydecane, and the like, can be used as coupling agents.

Organoalkyl phosphites, aryl phosphites and arylalkyl phosphites are considered useful as coupling agents in this invention.

Examples of suitable multiisocyanate coupling agents include benzene-1,2,4-triisocyanate, naphthalene-1,2,5,7-tetraisocyanate, and the like and mixtures thereof. Commercially available products known as PAPI-1, a polyarylpolyisocyanate having an average of 3 isocyanate groups per molecule and an average molecular weight of about 380 are suitable.

The multiimines, also known as multiaziridinyl compounds, such as those containing 3 or more aziridine rings per molecule, are useful as coupling agents. Other compounds useful as coupling agents include tetravinyl silane, trivinyl phosphine, the triaziridinyl phosphine oxides or sulfides such as tri(1-aziridinyl)phosphine oxide, tri(2-methyl-1-aziridinyl)-phosphine oxide, tri(2-ethyl-3-decyl-1-aziridinyl)phosphine sulfide, and the like and mixtures thereof.

The multialdehyde coupling agents are represented by compounds such as 1,4,7-naphthalenetricarboxyaldehyde, 1,7,9-anthracenetricarboxyaldehyde, 1,3,5-pentanetricarboxyaldehyde, and similar multialdehyde-containing aliphatic and aromatic compounds. The multiketones are represented by compounds such as 1,4,9,10-anthracenetetrone, 2,3-diacetonylcyclohexanone, and the like. Examples of the multianhydrides include pyromellitic dianhydride, styrene-maleic anhydride copolymers, and the like. Examples of the multiesters include diethyladipate, triethylcitrate, 1,3,5-benzenetricarboxylic acid, triethyl ester, and the like. Mixtures of multialdehydes can be used.

Among the multihalide coupling agents are the silicon tetrahalides such as silicon tetrachloride, silicon tetrabromide, and silicon tetraiodide; the trihalosilanes such as trichlorosilane, trichloroethylsilane, tribromobenzylsilane, and the like; and the multihalogen-substituted hydrocarbons, such as 1,3,5-tri(bromomethyl)benzene, 2,5,6,9-tetrachloro-3,7-decadiene, and the like, in which the halogen is attached to a carbon atom which is alpha to an activating group such as an ether linkage, a carbonyl group, or a carbon-to-carbon double bond. Substituents inert with respect to lithium atoms in the terminally reactive polymer can also be present in the active halogen-containing compounds. Alternatively, other suitable reactive groups different from the halogens as described above can be present.

Other metal multihalides, particularly those of tin, lead, or germanium, can be employed as coupling and branching agents. Tri- and tetra-alkoxy tin compounds may be used. Silicon or other metal multialkoxides, such as silicon tetraethoxide, are also suitable coupling agents.

Examples of compounds containing more than one type of functional group include 1,3-dichloro-2-propanone, 2,2-dibromo-3-decanone, 2,4-dibromo-3-pentanone, 1,2; 4,5-diepoxy-3-pentanone, 1,2; 4,5-diepoxy-3-hexanone, 1,2; 11,12-diepoxy-8-pentadecanone, 1,3; 18,19-diepoxy-7,14-eicosanedione, and the like.

Useful multifunctional coupling agents include epoxidized vegetable oils such as epoxidized soybean oil, epoxidized linseed oil and the like or mixtures thereof.

The presently preferred coupling agent is epoxidized vegetable oil. Most preferred is epoxidized soybean oil.

Process

The unique polymodal tapered block character of the polymer and improved environmental stress crack resistance of articles made from the polymer are produced by the unique sequences of an initial charge of monovinylaromatic monomer and initiator preceding a second charge of initiator and monovinylaromatic monomer, followed by two separate charges of a mixture of monovinylaromatic monomer and conjugated diene, followed by a separate charge of conjugated diene monomer, and a subsequent coupling step.

The first initiator charge produces active living monovinyl aromatic component polymer blocks with alkali metal atoms (from the initiator) on at least one end to form active reaction sites. Each subsequent monomer charge adds monomer to the living polymer chain at the alkali metal reaction. At each stage of charging, polymerization is allowed to continue until essentially no free monomer is present.

With each subsequent charge which includes initiator a new polymer-lithium species will be produced, and each subsequent monomer charge has an opportunity for polymerization of part of the charge with each of the existing polymer-lithium species. Each of the active living polymer chains will be terminated on both ends with monovinyl aromatic blocks after polymerization of each monomer charge containing monovinyl aromatic. When mixtures of monovinyl aromatic monomer and conjugated diene are charged, the polymer chains will be terminated with the monovinyl aromatic rich ends of the tapered blocks prior to coupling. After virtually complete polymerization of the final monomer charge, the active living linear block copolymers are charged with at least one difunctional or polyfunctional coupling agent to allow coupling of each of the living species with each of the other living species or with others of the same living species to form the desired polymodal tapered block copolymers. If the coupling agent is not 100 percent efficient and/or if less or more than a stoichiometric amount is used, there can be some uncoupled terminated polymer chains of each of the species in the final reaction mixture.

Use of difunctional coupling agents will produce predominantly linear polymer chains. Depending upon functionality, various degrees and kinds of branching may be accomplished with polyfunctional coupling agents. Variations in the amount of a particular polyfunctional coupling agent also can be used to manipulate the degree and kind of branching at the coupling sites.

The charging sequence of this invention and the resulting polymers at each stage are exemplified using a selected monovinylaromatic monomer, conjugated diene and polyfunctional coupling agent in the following table.

TABLE 1

| Step | Invention Charging Sequence Contents of Charge | Resulting Polymer Chains |
|---|---|---|
| (a) | randomizer, initiator$_1$ and styrene$_1$ | $S_1$—Li$_1$ |
| (b) | initiator$_2$ and styrene$_2$ | $S_1$—$S_2$—Li$_1$<br>$S_2$—Li$_2$ |
| (c) | butadiene$_1$ and styrene$_3$ | $S_1$—$S_2$—$B_1/S_3$—Li$_1$<br>$S_2$—$B_1/S_3$—Li$_2$ |
| (d) | butadiene$_2$ and styrene$_4$ | $S_1$—$S_2$—$B_1/S_3$—$B_2/S_4$—Li$_1$<br>$S_2$—$B_1/S_3$—$B_2/S_4$—Li$_2$ |
| (e) | butadiene$_3$ | $S_1$—$S_2$—$B_1/S_3$—$B_2/S_4$—$B_3$—Li$_1$ |
| (f) | epoxidized vegetable oil | $S_2$—$B_1/S_3$—$B_2/S_4$—$B_3$—Li$_2$<br>polymodal tapered block polymers with styrene terminal blocks | where S = styrene
B = butadiene
B/S = tapered block
Li = residue from a monoalkali metal initiator remaining on the end of the polymerization chain prior to termination or coupling.
subscripts = designation of the numerical order in which that particular component was charged or formed.

The randomizer is usually added with the diluent initially charged to the reactor. The third and fourth charges (c) and (d) which have two monomers may be either a mixture of the two monomers or simultaneous charging of two separate monomers.

As can be seen from the intermediate products listed in the charging sequence table above, there are at least two distinct species of polymer chains before coupling. Thus, polymodal tapered block copolymers comprising relatively high and low molecular weight species can be produced.

Tapered blocks in each of the growing polymer chains are produced by simultaneously charging with both monomers in the third and fourth steps shown in the preceeding table of a typical inventive charging sequence.

The randomizer regulates tapering or random polymerization of the monovinylaromatic monomer and the conjugated diene in a mixed monomer charge. Choice of randomizer can be used to manipulate the direction of taper in blocks resulting from charges of mixtures of monomers. The taper can be either a graduation from conjugated diene rich chain to monovinylaromatic rich chain or a graduation from a monovinylaromatic rich chain to conjugated diene rich chain according to which monomer enters the chain faster. For example, when tetrahydrofuran is used as a randomizer, the diene enters into the chain faster than the monovinyl substituted aromatic; therefore, when both the monovinylaromatic monomer and the conjugated diene are present, the block tapers gradually from an essentially polybutadiene block to an essentially monovinyl substituted aromatic polymer segment.

The weight ratio of monovinyl substituted aromatic monomer to conjugated diene monomer charged in steps (c) and (d) is from about 1:0.63 to about 1:2, preferably from about 1:0.67 to about 1:1.8, and more preferably from about 1:0.8 to about 1:1.5. The weight ratios of monovinyl substituted aromatic monomer to conjugated diene monomer in each of the two tapered blocks in the same polymer chain can be the same or different.

Generally each of the two tapered blocks made in steps (c) and (d) can be of about equal size; however, actual sizes of the two tapered blocks can vary within the same copolymer depending upon the amounts of monomers charged in each of the third and fourth monomer charges.

Prior to coupling, all of the living polymer chains have monovinylaromatic terminal blocks on one end because of the initial monovinylaromatic charge (a) and charge (b) made with initiator; the living ends of the chains prior to coupling will have conjugated diene blocks because of the fifth charge (e) containing only conjugated diene monomer.

In addition to the sequence of additions of the monomers and of the initiator, it is important to control the amount of each monomer and initiator addition at each stage or increment so that a suitable proportion of block sizes and proportion of polymodality is obtained. Generally in a presently preferred embodiment of this invention to obtain copolymers with a 75 weight percent polymerized monovinyl-aromatic content based on total weight of the copolymer, from about 27 to about 80 weight percent of the total weight percent of monovinylaromatic monomer is charged in step (a), from about 7 to about 33 weight percent of the total weight of monovinylaromatic monomer is charged in step (b), from about 5 to about 47 weight percent of the total weight of monovinylaromatic monomer is charged in step (c), and from about 5 to about 47 weight percent of the total weight percent of monovinylaromatic monomer is charged in step (d). Generally more preferably from about 40 to about 67 weight percent of the total weight percent of monovinylaromatic monomer is charged in step (a), from about 13 to about 27 weight percent of the total weight percent of monovinylaromatic monomer is charged in step (b), from about 8 to about 33 weight percent of the total percent of monovinylaromatic monomer is charged in step (c), and from about 8 to about 33 weight percent of the total percent of monovinylaromatic monomer is charged in step (d). Generally presently most preferably, from about 47 to about 60 weight percent of the total weight percent of monovinylaromatic monomer is charged in step (a), from about 16 to about 24 weight percent of the total weight percent of monovinylaromatic monomer is charged in step (b), from about 11 to about 29 weight percent of the total percent of monovinylaromatic monomer is charged in step (c), and from about 11 to about 29 weight percent of the total percent of monovinylaromatic monomer is charged in step (d).

It is feasible to stretch out over an interval of time the addition of one or more of the increments of initiator and/or the input of the appropriate monovinylarene monomer charge, thus spreading (increasing) further the polymodality of the resulting product upon coupling.

The polymerization process is carried out in a hydrocarbon diluent at any suitable temperature in a range of about −10° to about 150° C., preferably in the range of about 0° to about 110° C., at pressures sufficient to maintain the reaction mixture substantially in the liquid phase. Temperatures and pressures will peak during polymerization of each monomer charge and then decrease when essentially no free monomer is left to react. Appropriate hydrocarbon diluents include linear and cycloparaffins such as butane, pentane, hexane, octane, cyclohexane, cyclopentane and mixtures thereof. Presently preferred is cyclohexane. Generally the choice of hydrocarbon or hydrocarbon mixture and temperature is such that the resulting polymer is in solution.

Small amounts of polar compounds are used to improve the effectiveness of alkylmonoalkali metal initiators such as n-butyllithium; dissociation of the alkylmonoalkali metal initiators affects the rate of initiation and polymerization. The polar compounds also affect partial randomization of the monovinylarene/conjugated diene so as to increase the random portion of the tapered block. The polar compounds are generally used in admixture with the hydrocarbon diluent.

The amounts of polar compounds used as randomizers and promoters of effectiveness of initiators in this invention will vary according to the reactivity and effectiveness of the particular randomizer used. For example, 1,2-dimethoxyethane, tetramethylethylenediamine and 1,2-dimethoxybenzene are much more efficient randomizers than most of the others listed above when used with the particular initiators and monomers used in the invention runs described below. However, tetrahydrofuran is often used because the reaction will go nearer to completion in a shorter time after the initial reaction in the monomer rich environment. Also, there are dramatic variations in the amounts of each of these most efficient randomizers which will be needed. For example, for polymerizations such as those shown in the examples of invention runs in Table 4 of this application, much more tetrahydrofuran than 1,2-dimethoxyethane would be needed.

The amounts of polar compounds used as randomizers will also vary according to the desired molecular structure of the portions of tapered blocks which result from conjugated diene addition. For example, when using tetrahydrofuran, and 1,4 addition in excess of 1,2 addition is desired, then smaller amounts of the tetrahydrofuran would be used. In this example, when it is desirable that the tapered blocks of the polymer have more nearly equal amounts of 1,4 addition of butadiene and 1,2 addition of butadiene or only a little more 1,4 addition than 1,2 addition of butadiene, more of the tetrahydrofuran can be used.

When polymers with higher vinyl character resulting from 1,4 addition in excess of 1,2 addition are desired, then the useful amounts of tetrahydrofuran needed would be larger. However, use of too much randomizer can result in excessive polymer-lithium termination during polymerization and poor stability of the polymer or undesired side reactions, depending upon choice of randomizer. Use of too little randomizer would result in inefficient initiator use, broader molecular weight distribution and compositional variations.

The initial monovinylaromatic charge is made with the randomizer present for the additional effect of causing the monovinylaromatic component resulting from each initiator charge to be of relatively narrow molecular weight distribution. By varying the amounts of initiator in each of the two charges having initiator, the differences in molecular weights of the monovinylaromatic components resulting from each of the two charges can be increased.

Amounts of initiator employed are those which will produce resins with desirable melt flow which can be used neat or in blends to make articles with a good balance of properties including minimal blueness, good impact strength, good environmental stress crack resistance and flexural modulus. Presently preferred are amounts of initiator in each of the two initiator charges sufficient to obtain a block copolymer having a melt flow ranging from about 2 to about 50 g/10 minutes, more preferably from about 3 to about 40 g/10 minutes, and most preferably from about 4 to about 30 g/10 minutes, as determined by ASTM D1238-73, condition 200° C./5.0 kg. The amounts of initiator contemplated as useful in each of the two charges having initiator are shown in Table 2.

Use of too small an amount of initiator would result in high molecular weight polymers. Conversely, use of too large an amount of initiator would result in polymers having short chain polymeric species and low molecular weight.

The weight ratio of the amounts of initiator in each of the charges having initiator can be represented as 1:0.25-300.

$$Li_1:Li_2::1:0.25-300$$

wherein
$Li_1$ = initiator in the first charge
$Li_2$ = initiator in the second charge More preferably for most applications, the amount of initiator in the second charge of initiator is from about 0.75 to about 10.0 times, based on weight, as much as the amount of initiator in the first initiator charge. Presently most preferred is an amount of initiator in the second charge which is from about 0.9 to about 5 times, based on weight, as much as the amount of initiator in the first initiator charge.

Varying the weight ratios of the initiator charges will result in variations of the proportionate amounts of species present in the copolymer. Other factors affecting the proportionate amounts of species present in the copolymer include presence of impurities and/or scavengers in the reactor, effectiveness of the polar randomizer as a promoter, choice of coupling agent(s), and polymerization temperature.

The polymerization is carried out in a substantial absence of oxygen and water, preferably under an inert gas atmosphere. Prior to the coupling step, the reaction mass contains a very high percentage of molecules (polymer chains) in which an alkali metal cation is positioned at one end of each polymer chain. Impurities in the feed such as water or alcohol reduce the amounts of monoalkali metal polymer in the reaction mass.

After essentially complete polymerization of the final charge added to the polymer reaction, one or more suitable difunctional or polyfunctional coupling agents is added. As used here, the term "coupling" means the bringing together and joining, by means of one or more central coupling atoms or coupling moieties, two or more of the living monoalkali metal-terminated polymer chains. A wide variety of compounds for such purposes can be employed.

Any effective amount of the coupling agent can be employed. While the amount is not believed to be particularly critical, a stoichiometric amount relative to the active polymer-alkali metal tends to promote maximum coupling as a generality. Presently preferred is an amount of coupling agent slightly greater than stoichiometric relative to the active polymer-alkali metal. However, less than stoichiometric amounts can be used for higher degrees of coupling where desired for particular products of broadened molecular weight distribution.

Typically, the total amount of coupling agent is in the range of about 0.005 to 10 phm (parts per 100 parts of total monomers employed in the polymerization). Presently preferred when most combinations of monomers and coupling agents are used is about 0.2 to about 0.6 phm of coupling agent, depending upon amounts of initiator used. Presently most preferred is about 0.3 to about 0.5 phm, depending upon amounts of initiator used. Use of an amount of a reasonably high efficiency coupling agent within these ranges provides polymers with a moderately broad molecular weight distribution. Use of an insufficient amount of coupling agent will result in less complete coupling of the living polymer chains and, depending upon choice of coupling agent, more branching; use of an excessive amount of coupling agent will have the same result.

At the conclusion of the coupling process, the coupled polymer may still contain bound polymeric alkali metal alkoxides depending on the type of coupling agent employed. The system is treated with an active compound such as water, alcohol, phenols, carbon dioxide or linear saturated aliphatic mono- and dicarboxylic acids to remove any remaining alkali metal from the copolymer chain.

While the polymer product is still in solution, stabilization agents can be added. Additional stabilizers could be added during finishing before pelletizing. This treatment will provide oxidative stability for the polymer during processing and handling and subsequent long term use.

Commonly used stabilization processes can use a combination of compounds, including, but not limited to, a hindered phenol and an organophosphite, particular examples of which are octadecyl 3-(3',5'-di-t-butyl-4'-hydroxyphenyl) propionate and tris-nonylphenyl-phosphite.

After stabilization, the hydrocarbon diluent is then flashed from the polymer solution to increase the solids content. The polymer cement, i.e. the polymer in the polymerization solvent, usually contains about 10 to 40, more usually 20 to 35, weight percent solids, the balance solvent. Preferably, but not necessarily, the polymer cement is flashed to remove by evaporation a portion of the solvent so as to reduce the solvent content to a concentration of about 0 to 50, more usually about 0 to 10, weight percent (corresponding to a solids content of about 100 to 50, more usually about 100 to 90, weight percent).

Flashing of the polymer cement may be followed by desolventizing extrusion with vacuum in commercial production or by other vacuuming processes to achieve consistent solvent content of less than 0.3 weight percent.

The resinous copolymeric products can be, and normally are, compounded with anti-oxidants, anti-blocking agents, release agents and other additives, as known in the compounding arts.

A typical charging sequence and useful ranges of amounts of the charges is given in Table 2.

TABLE 2

| | Ranges of Amounts of Components in a Typical Invention Charging Sequence[a] | | | |
|---|---|---|---|---|
| Step | Component[b] | Broad Range[c] | Preferred Range[c] | More Preferred Range[c] |
| (a) | randomizer[d] | 0.001–3 | 0.005–1.5 | 0.015–0.3 |
| | initiator | 0.005–1.5 | 0.01–1.0 | 0.02–0.1 |
| | and mono-vinylarene monomer | 20–60 | 30–50 | 35–45 |
| (b) | initiator | 0.005–1.5 | 0.01–1.0 | 0.02–0.1 |
| | and mono-vinylarene monomer | 5–25 | 10–20 | 12–18 |
| (c) | mono-vinylarene monomer and | 4–35 | 6–25 | 8–22 |
| | conjugated diene monomer | 4–35 | 6–25 | 8–22 |
| (d) | mono-vinylarene monomer and | 4–35 | 6–25 | 8–22 |
| | conjugated diene monomer | 4–35 | 6–25 | 8–22 |

TABLE 2-continued

Ranges of Amounts of Components in a Typical Invention Charging Sequence[a]

| Step | Component[b] | Broad Range[c] | Preferred Range[c] | More Preferred Range[c] |
|---|---|---|---|---|
| (e) | conjugated diene monomer | 1–10 | 2–8 | 4–6 |
| (f) | coupling agent | 0.005–10 | 0.2–0.6 | 0.3–0.5 |

[a]Charges of monomer and initiator are made in the presence of an amount of diluent or solvent sufficient to prevent excessive heat of reaction.
[b]Monomers within each charge having more than one monomer can be added simultaneously or as a mixture, slowly or quickly. Randomizer in charge (a) may be already present in the diluent or added as a separate charge.
[c]Ranges of amounts are given in parts by weight per 100 parts by weight of total monomers (phm).
[d]To achieve high vinyl content, up to 3 phm randomizer may be used.

After coupling, at least the following coupled and uncoupled polymeric species are present in the polymer of the invention:

$S_1$-$S_2$-$B_1$/$S_3$-$B_2$/$S_4$-$B_3$-x-$B_3$-$S_4$/$B_2$-$S_3$/$B_1$-$S_2$-$S_1$
$S_1$-$S_2$-$B_1$/$S_3$-$B_2$/$S_4$-$B_3$-x-$B_3$-$S_4$/$B_2$-$S_3$/$B_1$-$S_2$
$S_2$-$B_1$/$S_3$-$B_2$/$S_4$-$B_3$-x-$B_3$-$S_4$/$B_2$-$S_3$/$B_1$-$S_2$
$S_2$-$B_1$/$S_3$-$B_2$/$S_4$-$B_3$
$S_1$-$S_2$-$B_1$/$S_3$-$B_2$/$S_4$-$B_3$ wherein
S = monovinylaromatic block
B = conjugated diene block
B/S = tapered block
x = residual coupling agent or coupling site
subscripts = indications of the charges which are the source of the polymer blocks.

Depending upon choice and amount of coupling agent or agents and whether coupling agents are charged as a mixture or incrementally, there can be present other polymeric species with varying degrees of branching.

Blends

The resinous polymodal copolymer products of this invention can be blended with other styrenic polymers such as polystyrene acrylonitrile-butadiene-styrene copolymers (ABS), styrene-acrylonitrile copolymers (SAN) and other styrene copolymers. When less transparency is desired or if transparency is not necessary, the invention copolymers can be blended with polyolefins and/or olefin copolymers.

Blends of the invention copolymers with polymers of styrene are particularly useful applications for the improved tapered block copolymers of this invention. Articles made from these blends have surprisingly good environmental stress crack resistance and other advantageous properties such as transparency and impact strength. For example, articles made from blends of styrene homopolymer and polymers of this invention typically are transparent and have good impact strength and have dramatically improved environmental stress crack resistance.

The presently preferred polymers of styrene employed in the blends of this invention are usually (a) homopolymers of styrene; or (b) copolymers of styrene as a major component with a minor amount of any other copolymerizable monovinylaromatic compound other than styrene, such as alpha-methylstyrene, vinyltoluene or para-tert-butyl styrene. A minor amount of other monomers such as methyl acrylate, methyl methacrylate, acrylonitrile and the like can be copolymerized with the styrene.

The invention copolymers can be blended with styrene resins made in bulk polymerization. These resins are commonly prepared by heating styrene and any comonomer at temperatures in the range of 100° to 200° C. with application of pressure, if necessary, to combine the monomers. The polymerization can also be carried out at lower temperatures by the addition of free-radical generating peroxidic catalysts such as benzoyl peroxide, acetyl peroxide, di-t-butyl peroxide and the like. Alternatively, the polymerization can be carried out in suspension to yield a dry powder or in emulsion, usually resulting in a latex of polystyrene which can be coagulated to yield the solid powdery polystyrene. The polymerization can also be carried out in solution with precipitation of the product, if desired. Solvent can be removed by standard techniques such as steamstripping or solvent evaporation.

High impact polystyrene (HIPS) can be successfully employed in blends with the invention copolymers. Suitable high impact polystyrenes can be prepared by polymerizing styrene in the presence of an elastomer, typically polybutadiene rubber. In these resins the styrene forms a continuous phase throughout which the rubber particles are dispersed.

The blends of this invention can be prepared by any suitable means including blending, tumbling and extrusion. Examples of these methods include, but are not limited to, dry mixing in the form of a powder or pellets, wet mixing in the form of a solution or slurry, and melt extrusion compounding.

The polymers and any other ingredients or additives may be mechanically blended together in the desired proportions with the aid of any suitable mixing device conveniently used for mixing rubbers or plastics, such as, for example, a differential roll mill, a Banbury mixer, or an extruder.

In these types of methods the polymers and any other components and additives used can be in any form, such as, for example, fluff, powder, granulate, pellet, solution, slurry, and/or emulsion. Any additive can be combined with the polymers according to any method known in the art. Examples of incorporation methods include, but are not limited to, dry mixing in the form of a powder and wet mixing in the form of a solution or slurry.

Melt extrusion compounding can be carried out using any suitable method such as in single screw or twin screw extruders or other melt extruders at temperatures above the melting point or glass transition temperature of the polymers.

The presently preferred method comprises blending the polymers in powder or granulate form and extruding the blend in sheet form to feed a thermoforming or direct feed to an injection or blow molder.

In order to facilitate thorough mixing of the polymers and to develop the desired combination of physical properties, pellets are generally metered by loss-in-weight feeders or by screw feeders at a temperature low enough to avoid softening the pellets. The metered pellets are dropped into an extruder which melts and blends the components to provide a homogeneous melt.

Alternatively, solution blending methods known in the art may be used.

The ranges of amounts of polymers useful in blends varies according to the properties and economics desired. For example, when an invention copolymer is blended with a polymer of styrene, practical ranges include using amounts such as from about 5 to about 95 weight percent polymer of styrene, more usually from about 15 to about 90 weight percent polymer of styrene, and most preferably from about 30 to about 80 weight percent polymer of styrene with the balance being one or more of the polymodal resinous copolymer products of this invention. For a more particular example, when an invention copolymer is blended with general purpose polystyrene, broad ranges include using amounts such as from about 10 to about 90 weight percent polystyrene, more usually from about 20 to about 85 weight percent polystyrene, and most preferably from about 40 to about 70 weight percent polystyrene with the balance being one or more of the polymodal resinous copolymer products of this invention. Generally, use of too much of the invention copolymers in a blend would result in good properties but loss of economic advantage. Use of too little of the invention copolymers in a blend would result in loss of impact resistance. These blends can be economical ways of gaining the desirable attributes of both polystyrene and the invention polymers while maintaining good environmental stress crack resistance in articles made from the blends.

The compositions of this invention or blends thereof can be extruded, thermoformed, injection molded, blow molded, or made into films or sheets. Articles made from the compositions of this invention are transparent, have excellent environmental stress crack resistance to fats and oils, and have other physical properties within acceptable ranges for such applications as drinking cups, lids, bottles, other food containers, medical drainage units, shrink wrap and over wrap. Articles made from blends of this invention can economically provide advantageous properties for similar applications.

Test Procedures

The environmental stress crack resistance potential of the block copolymers was determined in an accelerated test referred to as the Puncture Test. Test specimens about 2 inches (50 mm) square were cut from an interior layer about 0.015 inches (0.4 mm) thick from a coil or roll of extruded sheet. The side of the film or sheet facing away or furtherest from the center of the coil or roll, of course, must "stretch" or cover more distance than the side closest to the center of the coil or roll. Results obtained from the outside part of a rolled layer are termed "curl down" and those from the inside part are termed "curl up".

Each specimen was clamped over a hole about 25 mm in diameter and 4 drops of soybean oil was placed on the specimen over the hole. A rounded tipped stainless steel rod about ¼ cm in diameter was weighted with a 2 kg load and brought into contact with the specimen. The time to failure in minutes was recorded. Ten specimens of each run were tested and the results were averaged.

The puncture test results appear to correlate well with other environmental stress crack resistance test results and are obtained more quickly.

Except as noted in the examples, melt flows were measured using an extrusion Plastometer from Tinius Olson Testing Machine Co., at 200° C. with a 4.9 kg weight.

Other properties of test specimens were tested using ASTM procedures shown in Table 3.

TABLE 3

| Test Procedures Used | |
|---|---|
| Property | ASTM Method |
| Flow rate, g/10 min Condition 200° C./5.0 kg | D 1238-88 |
| Haze, % | D 1003-61 (1990) |
| Transmittance, % | D 1003-61 (1990) |
| Shore D hardness | D 2240-91 |
| Tensile strength at yield and break, MPa | D 638-91 at 50 mm/min Type I test specimens |
| Elongation at yield and break, % | D 638-91 at 50 mm/min |
| Flexural modulus, MPa | D 790-86 |
| Izod impact strength, notched, J/m | D 256-88 |
| Vicat softening point, °C. | D 1525-91 |
| Total energy dart drop, J | D 4272-85 |

EXAMPLES

The following examples will describe in more detail the experimental process used and the resinous polymodal tapered block copolymers with vinylarene terminal blocks obtained as a result of the process, and blends made with the invention copolymers. These examples should be taken as illustrative and not restrictive.

Styrene and butadiene were chosen as monomers to exemplify the invention, and randomizer, initiator, coupling agent and diluent appropriate for these monomers were used. Quantities of reagents are usually expressed in parts per hundred monomer (phm) based on the total weight of monovinylarene and conjugated diene employed.

Example I

This example describes four invention polymerization runs (runs 1, 2, 3, 4) that were carried out to produce resinous polymodal coupled tapered block styrene/butadiene copolymers with resinous terminal blocks. Styrene (from Stirling Chemical) and 1,3-butadiene (from Texas El Paso) were dried by passage over activated alumina (Kaiser A-201), and then copolymerized and coupled in a 6-stage process using n-butyllithium initiator (from Lithium Corporation of America).

Polymerization runs were carried out under nitrogen in a stirred, jacketed, stainless steel 7.6-liter reactor employing essentially anhydrous reactants and conditions. The anhydrous mixtures were stirred continuously during the polymerization process. The cyclohexane diluent, which contained 0.04 phm tetrahydrofuran (THF) in each polymerization except in Example IV, was preheated to about 50° C. before monomers were charged to the reactor. The n-butyllithium was charged as a 2 weight percent solution in cyclohexane. In polymerization steps in which both butadiene and styrene were charged, they were charged simultaneously as a mixture.

In the coupling step, the Vikoflex® 7170 coupling agent used was an epoxidized vegetable oil commercially available from Viking Chemical Company. In the terminating step, carbon dioxide from a pressurized container was admitted to provide about 0.4 phm carbon dioxide to the reactor. Water was also added in an amount slightly in stoichiometric excess of the initiator to separate the lithium residues from the polymer chains.

The antioxidant mixture added in the stabilizing step contained a hindered phenol [octadecyl 3-(3′,5′-di-t-butyl-4′-hydroxyphenyl) propionate, commercially available as Irganox® 1076 from Ciba-Geigy] and an organic phosphite (tris-nonylphenyl phosphite, available as TNPP from GE Specialty Chemicals). Each stabilizer was dissolved separately in cyclohexane and mixed together. Enough of the mixture was added to the reactor to provide 0.25 phm hindered phenol and 1 phm organic phosphite. In Runs 1 and 2 a microcrystalline wax (BE Square ® 195) was also added as an antiblocking agent.

After each addition of monomer, initiator or additive, the feed lines were rinsed with approximately 10–20 phm cyclohexane solvent and cleared with a nitrogen sparge.

Following the stabilization step, each copolymer solution was flashed at 178° C.–180° C. to remove a portion of the diluent. Substantially all of the remaining diluent was removed in a vacuum oven by drying at 90° C. for one hour. The resulting polymer was chopped in a granulator into crumb size and then dried for an additional hour in a vacuum oven.

In each of the four runs (1, 2, 3, and 4), 2000 g total monomers (butadiene and styrene) were used. About 76 weight percent of the total amount of cyclohexane diluent (3130 g) was charged initially. The remaining cyclohexane diluent was added during the run as a diluent or flush for the various reactants added in subsequent steps. In these four polymerizations, the weight ratio of monomers charged was 75/25 styrene/butadiene.

The charges and the results of the runs are summarized in Table 4. Tapered butadiene/styrene segments were formed in steps 3 and 4 by charging both butadiene and styrene monomers.

The charging sequence used was i, $S_1$, i, $S_2$, $B_1/S_3$, $B_2/S_4$, $B_3$, coupling agent. The monomer weight ratios corresponding to the $S_1$, $S_2$, $B_1/S_3$ $B_2/S_4$, $B_2$ sequence were 40, 15, 10/10, 10/10, 5. Weight ratios of amounts of initiator used in the first two polymerization steps of each of the four runs was kept constant at 1:2.33.

The devolatilized copolymers from runs 1, 2, 3 and 4 were designated invention copolymers 1, 2, 3 and 4, and had melt flows of 8.4, 7.5, 7.2 and 7.1 g/10 min, respectively.

Invention resin A was prepared by dry blending samples of the copolymers from runs 1, 2, 3 and 4 in equal amounts. Resin A had a melt flow of 7.7 g/10 min.

TABLE 4

| Components[a] | Invention Runs - Polymer A | | | |
|---|---|---|---|---|
| | Run 1 | Run 2 | Run 3 | Run 4 |
| Step 1 | | | | |
| Cyclohexane, phm | 152 | 152 | 152 | 152 |
| Tetrahydrofuran, phm | 0.04 | 0.04 | 0.04 | 0.04 |
| n-Butyllithium initiator, phm | 0.03 | 0.03 | 0.03 | 0.030 |
| Styrene, phm | 40 | 40 | 40 | 40 |
| Polymerization Time, min | 12 | 12 | 12 | 12 |
| Peak Polymerization Temperature, °C. | 94.6 | 88.7 | 90.8 | 88.3 |
| Peak Polymerization Pressure, psi | 30 | 30 | 30 | 30 |
| Step 2 | | | | |
| n-Butyllithium initiator, phm | 0.07 | 0.07 | 0.07 | 0.07 |
| Styrene, phm | 15 | 15 | 15 | 15 |
| Polymerization Time, min | 12 | 12 | 14 | 12 |
| Peak Polymerization Temperature, °C. | 84.4 | 77.8 | 78.1 | 78.3 |
| Peak Polymerization Pressure, psi | 40 | 30 | 40 | 40 |
| Step 3 | | | | |
| Butadiene, phm | 10 | 10 | 10 | 10 |

TABLE 4-continued

| Components[a] | Invention Runs - Polymer A | | | |
|---|---|---|---|---|
| | Run 1 | Run 2 | Run 3 | Run 4 |
| Styrene, phm | 10 | 10 | 10 | 10 |
| Polymerization Time, min | 20 | 20 | 20 | 20 |
| Peak Polymerization Temperature, °C. | 96.7 | 84.8 | 86.7 | 84.8 |
| Peak Polymerization Pressure, psi | 50 | 40 | 40 | 40 |
| Step 4 | | | | |
| Butadiene, phm | 10 | 10 | 10 | 10 |
| Styrene, phm | 10 | 10 | 10 | 10 |
| Polymerization Time, min | 20 | 20 | 20 | 20 |
| Peak Polymerization Temperature, °C. | 103.7 | 104.1 | 104.6 | 104.8 |
| Peak Polymerization Pressure, psi | 60 | 55 | 60 | 60 |
| Step 5 | | | | |
| Butadiene, phm | 5 | 5 | 5 | 5 |
| Polymerization Time, min | 12 | 19 | 10 | 10 |
| Peak Polymerization Temperature, °C. | 92.9 | 89.5 | 96 | 91.4 |
| Peak Polymerization Pressure, psi | 100 | 100 | 100 | 100 |
| Step 6 (Coupling) | | | | |
| Vikoflex 7170, phm | 0.3 | 0.3 | 0.3 | 0.3 |
| Time, min | 16 | 16 | 16 | 16 |
| Temperature, °C. | 93.5 | 99 | 95 | 86 |
| Pressure, psi | 100 | 80 | 100 | 100 |
| Step 7 (Terminating) | | | | |
| Water, phm | 0.2 | 0.2 | 0.2 | 0.2 |
| Carbon Dioxide, phm | 0.4 | 0.4 | 0.4 | 0.4 |
| Time, min | 25 | 25 | 25 | 25 |
| Temperature, °C. | 97 | 95 | 98 | 99 |
| Pressure, psi | 90 | 70 | 75 | 90 |
| Step 8 (Stabilizing) | | | | |
| Stabilizer Mixture, phm | 1.25 | 1.25 | 1.25 | 1.25 |
| Be Square 195, phm | 0.0015 | 0.0015 | 0.0015 | 0.0015 |
| Time, min | 5 | 5 | 5 | 5 |
| Temperature, °C. | 94 | 101 | 95 | 100 |
| Pressure, psi | 125 | 125 | 125 | 125 |
| Recovered Resin Melt Flow, g/10 min | 8.4 | 7.5 | 7.2 | 7.1 |

[a]After each addition of monomer, initiator or additive, the feed lines were rinsed with approximately 3–20 phm cyclohexane diluent and cleared with nitrogen.

Example II

Two comparison copolymers were prepared to demonstrate the importance of the structural features of the invention copolymers for environmental stress crack resistance. In these two comparison polymers styrene to butadiene weight ratio of the charged monomers was 74.4 to 25.5.

Copolymers 5, 6, 7 and 8 were made with one initial styrene charge, two tapered butadiene/styrene blocks, and no terminal butadiene segment prior to coupling. The polymerization charges and results are summarized in Table 5. These four copolymers were dry blended to form comparison resin B, which had a melt flow of 7.2 g/10 min.

Copolymers 9, 10, 11 and 12 were prepared with styrene, styrene, butadiene, styrene, and butadiene segments, in that sequence, and then coupled. These copolymers contain no tapered blocks. The polymerization charges and results are shown in Table 6. These four copolymers were dry blended to yield comparison resin C, which had a melt flow of 7.7 g/10 min.

TABLE 5

Comparison Runs - Polymer B

| Components[a] | Run 5 | Run 6 | Run 7 | Run 8 |
|---|---|---|---|---|
| Step 1 | | | | |
| Cyclohexane, phm | 205 | 205 | 205 | 205 |
| Tetrahydrofuran, phm | 0.04 | 0.04 | 0.04 | 0.04 |
| n-Butyllithium initiator, phm | 0.03 | 0.03 | 0.03 | 0.030 |
| Styrene, phm | 40.1 | 40.1 | 40.1 | 40.1 |
| Polymerization Time, min | 12 | 12 | 12 | 12 |
| Peak Polymerization Temperature, °C. | 83 | 85 | 82 | 76 |
| Step 2 | | | | |
| Butyllithium initiator, phm | 0.03 | 0.03 | 0.03 | 0.03 |
| Butadiene, phm | 8 | 8 | 8 | 8 |
| Styrene, phm | 19.7 | 19.7 | 19.7 | 19.7 |
| Polymerization Time, min | 40 | 40 | 40 | 40 |
| Peak Polymerization Temperature, °C. | 86 | 86 | 87 | 79 |
| Step 3 | | | | |
| n-Butyllithium initiator, phm | 0.05 | 0.05 | 0.05 | 0.05 |
| Butadiene, phm | 17.5 | 17.5 | 17.5 | 17.5 |
| Styrene, phm | 14.6 | 14.6 | 14.6 | 14.6 |
| Polymerization Time, min | 40 | 40 | 40 | 40 |
| Peak Polymerization Temperature, °C. | 106 | 106 | 109 | 100 |
| Step 4 (Coupling) | | | | |
| Vikoflex 7170, phm | 0.4 | 0.4 | 0.4 | 0.4 |
| Time, min | 16 | 16 | 16 | 16 |
| Temperature, °C. | 90 | 88 | 90 | 95 |
| Step 5 (Terminating) | | | | |
| Water, phm | 0.2 | 0.2 | 0.2 | 0.2 |
| Carbon Dioxide, phm | 0.4 | 0.4 | 0.4 | 0.4 |
| Time, min | 25 | 25 | 25 | 25 |
| Temperature, °C. | 88 | 82 | 85 | 85 |
| Step 6 (Stabilizing) | | | | |
| Stabilizer Mixture, phm | 1.25 | 1.25 | 1.25 | 1.25 |
| Time, min | 5 | 5 | 5 | 5 |
| Temperature, °C. | 87 | 83 | 85 | 88 |
| Recovered Resin Melt Flow, g/10 min | 7.3 | 6.8 | 7.1 | 7.5 |

[a] After each addition of monomer, initiator or additive, the feed lines were rinsed with approximately 3–20 phm cyclohexane diluent and cleared with nitrogen.

TABLE 6

Comparison Runs - Polymer C

| Components[a] | Run 9 | Run 10 | Run 11 | Run 12 |
|---|---|---|---|---|
| Step 1 | | | | |
| Cyclohexane, phm | 145 | 145 | 145 | 145 |
| Tetrahydrofuran, phm | 0.04 | 0.04 | 0.04 | 0.04 |
| n-Butyllithium initiator, phm | 0.03 | 0.03 | 0.03 | 0.030 |
| Styrene, phm | 40.1 | 40.1 | 40.1 | 40.1 |
| Polymerization Time, min | 12 | 12 | 12 | 12 |
| Peak Polymerization Temperature, °C. | 79 | 80 | 81 | 85 |
| Step 2 | | | | |
| n-Butyllithium initiator, phm | 0.03 | 0.03 | 0.03 | 0.03 |
| Styrene, phm | 19.7 | 19.7 | 19.7 | 19.7 |
| Polymerization Time, min | 12 | 12 | 14 | 12 |
| Peak Polymerization Temperature, °C. | 77 | 76 | 76 | 76 |
| Step 3 | | | | |
| Butadiene, phm | 8 | 8 | 8 | 8 |
| Polymerization Time, min | 16 | 16 | 16 | 16 |
| Peak Polymerization Temperature, °C. | 79 | 72 | 72 | 72 |
| Step 4 | | | | |
| n-Butyllithium, phm | 0.105 | 0.105 | 0.105 | 0.105 |
| Styrene, phm | 14.6 | 14.6 | 14.6 | 14.6 |
| Polymerization Time, min | 12 | 12 | 12 | 12 |
| Peak Polymerization Temperature, °C. | 79 | 94 | 92 | 81 |
| Step 5 | | | | |
| Butadiene, phm | 17.5 | 17.5 | 17.5 | 17.5 |
| Polymerization Time, min | 16 | 16 | 16 | 16 |
| Peak Polymerization Temperature, °C. | 94 | 95 | 95 | 94 |
| Step 6 (Coupling) | | | | |
| Vikoflex 7170, phm | 0.39 | 0.39 | 0.39 | 0.39 |
| Time, min | 16 | 16 | 16 | 16 |
| Temperature, °C. | 84 | 81 | 80 | 86 |
| Step 7 (Terminating) | | | | |
| Water, phm | 0.2 | 0.2 | 0.2 | 0.2 |
| Carbon Dioxide, phm | 0.4 | 0.4 | 0.4 | o.4 |
| Time, min | 25 | 25 | 25 | 25 |
| Temperature, °C. | 81 | 81 | 85 | 86 |
| Step 8 (Stabilizing) | | | | |
| Stabilizer Mixture, phm | 1.25 | 1.25 | 1.25 | 1.25 |
| Time, min | 5 | 5 | 5 | 5 |
| Temperature, °C. | 88 | 82 | 83 | 82 |
| Pressure, psi | 125 | 125 | 125 | 125 |
| Recovered Resin Melt Flow, g/10 min | 6.4 | 7.2 | 7.7 | 6.7 |

[a] After each addition of monomer, initiator or additive, the feed lines were rinsed with approximately 3–20 phm cyclohexane diluent and cleared with nitrogen.

Example III

Another comparative copolymer 13 without tapered styrene butadiene blocks was used for comparison with the invention resins. The comparative polymodal, coupled block copolymer of styrene and butadiene was essentially the same as the invention copolymer except that sequential butadiene and styrene charges were used in place of the mixture of butadiene and styrene used in the invention copolymer. This comparative copolymer was prepared from about 75 weight percent styrene and about 25 weight percent butadiene and was polymodal before coupling. Similar charges of initiator and randomizer were used. The monomer addition sequences were S, S, B, S, B in weight ratios of 40, 20, 7.5, 15, 17.5, respectively, followed by coupling. Comparative copolymer 13 had a melt flow of 7.0 g/10 min and was designated Resin D.

Example IV

Three comparative copolymers (14, 15 and 16) were prepared to demonstrate the importance of using two rather than one charges of mixtures of monomers next preceding the coupling step in the invention copolymer. Both polymerizations were carried out with a total monomer charge of 1500 g. About 79 weight percent of the cyclohexane diluent (3720 g) was charged initially. The rest of the diluent was added during the run as a diluent or flush for the other reactants. n-Butyllithium was used as the initiator in these polymerizations and THF was used as the randomizer.

Copolymers 14, 15, and 16 were prepared with one initial styrene charge, one styrene/butadiene tapered block, and a final butadiene segment next preceding the coupling step. Table 7 describes the charges and results of these polymerizations. The styrene to butadiene weight ratio of the charged monomers was 75 to 25.

Comparative Resin E was prepared by dry blending samples of the copolymers from runs 14, 15 and 16 in equal amounts. Resin E had a melt flow of 7.2 g/10 min.

TABLE 7

Comparative Runs - Resin E

| Components[a] | Run 14 | Run 15 | Run 16 |
|---|---|---|---|
| Step 1 | | | |
| Cyclohexane, phm | 152 | 152 | 152 |
| Tetrahydrofuran, phm | 0.04 | 0.04 | 0.04 |
| n-Butyllithium initiator, phm | 0.03 | 0.03 | 0.03 |

TABLE 7-continued

| | Comparative Runs - Resin E | | |
|---|---|---|---|
| Components[a] | Run 14 | Run 15 | Run 16 |
| Styrene, phm | 40 | 40 | 40 |
| Polymerization Time, min | 10 | 10 | 10 |
| Peak Polymerization Temperature, °C. | 86.7 | 82.4 | 83.6 |
| Peak Polymerization Pressure, psi | 30 | 40 | 30 |
| Step 2 | | | |
| n-Butyllithium initiator, phm | 0.07 | 0.07 | 0.07 |
| Styrene, phm | 15 | 15 | 15 |
| Polymerization Time, min | 10 | 10 | 10 |
| Peak Polymerization Temperature, °C. | 78.1 | 78.1 | 76.9 |
| Peak Polymerization Pressure, psi | 40 | 40 | 40 |
| Step 3 | | | |
| Butadiene, phm | 20 | 20 | 20 |
| Styrene, phm | 20 | 20 | 20 |
| Polymerization Time, min | 20 | 20 | 20 |
| Peak Polymerization Temperature, °C. | 120.3 | 115.0 | 113.3 |
| Peak Polymerization Pressure, psi | 60 | 70 | 80 |
| Step 4 | | | |
| Butadiene, phm | 5 | 5 | 5 |
| Polymerization Time, min | 19 | 10 | 10 |
| Peak Polymerization Temperature, °C. | 92.8 | 88 | 85.9 |
| Peak Polymerization Pressure, psi | 100 | 90 | 100 |
| Step 5 (Coupling) | | | |
| Vikoflex 7170, phm | 0.4 | 0.4 | 0.4 |
| Time, min | 16 | 16 | 16 |
| Temperature, °C. | 92.5 | 92 | 96 |
| Pressure, psi | 70 | 90 | 100 |
| Step 6 (Terminating) | | | |
| Water, phm | 0.2 | 0.2 | 0.2 |
| Carbon Dioxide, phm | 0.4 | 0.4 | 0.4 |
| Time, min | 25 | 25 | 25 |
| Temperature, °C. | 94.1 | 96 | 92 |
| Pressure, psi | 70 | 50 | 50 |
| Step 7 (Stabilizing) | | | |
| Stabilizer Mixture, phm | 1.25 | 1.25 | 1.25 |
| Time, min | 5 | 5 | 5 |
| Temperature, °C. | 95 | 97.2 | 93 |
| Pressure, psi | 125 | 125 | 125 |
| Recovered Resin Melt Flow, g/10 min | 8.8 | 7.0 | 6.5 |

[a]After each addition of monomer, initiator or additive the feed lines were rinsed with approximately 3-20 phm cyclohexane diluent and cleared with nitrogen.

Example V

Each of Resins A (from runs 1, 2, 3, 4), B (from runs 5, 6, 7, 8), C (from runs 9, 10, 11, 12), D (a commercial resin), and E (from runs 14, 15, 16) were analyzed for styrene and butadiene content.

One-gram samples of each of the resins tested were dissolved in 10 ml of toluene and precipated with about 25 ml of isopropanol. The solids from each sample were isolated, then redissolved in about 10 ml of deuterated chloroform. The chloroform solutions were dried overnight in a vacuum oven at 40° C. Half of each the dried samples was then redissolved in more deuterated chloroform and oven dried at 40° C. for 4 to 5 hours. The redried samples were then redissolved in an amount of deuterated chloroform sufficient to form 15 weight percent solutions which were run in 5 mm NMR tubes at ambient temperature in a Varian EM-390 instrument with $^1$H frequency of 90 MHz in the continuous wave mode. Concentrations of styrene and butadiene were calculated by integrating the areas under peaks representing proton concentrations of components in the samples.

Results of the NMR analysis are reported in weight percents in Table 8.

TABLE 8

| | Resin Analysis[a] | | | | |
|---|---|---|---|---|---|
| | Invention Resin A | Comparison Resin B | Comparison Resin C | Comparison Resin D | Comparison Resin E |
| Melt flow, g/10 min | 7.7 | 7.2 | 7.7 | 7.0 | 7.2 |
| Mw/Mn, thousands | — | 184/124 | 160/160 | — | — |
| Heterogeneity Index | — | 1.84 | 1.51 | — | — |
| Total styrene, wt % | 75.9 | 76.2 | 76.1 | — | 74.9 |
| Blocked styrene, wt % | 66.3 | 64.0 | 71.9 | — | 65.2 |
| 1,2-Butadiene, wt % | 3.5 | 4.7 | 3.3 | — | 3.7 |
| 1,4-Butadiene, wt % | 19.9 | 19.1 | 20.5 | — | 20.5 |

[a]Wt % determined by NMR analysis.

Example VI

This example compares results of puncture tests of films made from invention Resin A from Example I with results of puncture tests of films made from comparative Resins B and C from Example II, and D and E from Examples III and IV. Each sample was converted into sheet form by melt extrusion at a temperature of about 175°-185° C. using a sheet die and a cooled polishing roll. Puncture testing was done as described above. Longer test times indicate that the sample has more environmental stress crack resistance than samples with shorter test times.

The comparative test results are presented in Table 9. These results show that invention Resin A had an enhanced resistance to environmental stress cracking relative to comparative resins without tapered styrene/butadiene segments (Resin C and D), comparative Resin E with only one tapered block and a final butadiene block next preceding coupling and comparative Resin B which has two tapered blocks, but only one initiator charge and no butadiene block next preceding coupling.

TABLE 9

| Puncture Test Results of Neat Resins | | | | | | |
|---|---|---|---|---|---|---|
| | | | | | Puncture Test, min[a] | |
| Resin | Source | Type | MF, g/10 min | Thickness, mils | Curl Up | Curl Down |
| A | Ex. I | Invention | 7.1 | 15 | 178 | 190 |
| B | Ex. II | Comparative | 7.2 | 15 | 3.0 | 5.0 |
| C | Ex. II | Comparative | 7.7 | 16 | 6.0 | 8.2 |
| D | Ex. III | Comparative | 7.0 | 16 | 4.4 | 4.6 |
| E | Ex. IV | Comparative | 7.2 | 20 | 11 | 14.7 |

[a]Test method described in the specifications. Higher numbers indicate more enviromental stress crack resistance.

Example VII

In this example samples of the invention resin from Example I comparison resins from Examples II, III and IV were each blended with general purpose polystyrene so that blend properties could be compared. Each of the blends contained 40 wt % general purpose polystyrene (Novacor® 555 commerically available from Novacor) and 60 wt % of the monovinylaromatic-conjugated diene copolymer.

Polymer pellets were dry blended then melt extruded in a Werner-Pfleiderer ZSK-30 vented twin-screw extruder with screw feeder (equipment?) using an open vent and a barrel temperature of 210° C. The extruded polymer blend was converted into sheet form by melt extrusion at a temperature of about 175°-185° C. using a sheet die and a cooled polishing roll.

Puncture testing of each of the sample sheets was done as described in the puncture test procedure detailed above. Longer test times indicate that the sample has more environmental stress crack resistance than samples with shorter test times. The comparative test results are presented in Table 10. These results show that blends made with invention Resin A had an enhanced resistance to environmental stress cracking relative to blends made with the comparative Resin D which had no tapered styrene/butadiene blocks, and E with a single large tapered styrene/butadiene block.

The other samples were not tested as blends because their initial neat puncture test values were so low and values always drop significantly when blended with polystyrene.

TABLE 10

Puncture Tests Results of Blends[a]

| 60:40 Invention Resin:GPPS Blend | Type | Thickness, mils | Puncture Test, min[b] | |
|---|---|---|---|---|
| | | | Curl Up | Curl Down |
| A | Invention | 14 | 11 | 9.9 |
| D | Comparative | 16.5 | 1.2 | 1.4 |
| E | Comparative | 17 | 1.2 | 1.4 |

[a]No blends were made of Resin B and Resin C.
[b]Test method described in the specifications. Higher numbers indicate more environmental stress crack resistance.

While the polymers and methods of this invention have been described in detail for the purpose of illustration, the inventive polymers and methods are not to be construed as limited thereby. This patent is intended to cover all changes and modifications within the spirit and scope thereof.

That which is claimed is:

1. A method of preparing a copolymer under polymerization conditions in a reaction zone comprising:
   (a) charging a monovinylaromatic monomer and an initiator and in the presence of a randomizer allowing polymerization to occur until essentially no free monomer is present; thereafter
   (b) charging an initiator and a monovinylaromatic monomer and allowing polymerization to occur until essentially no free monomer is present; thereafter
   (c) charging a mixture of monovinylaromatic monomer and conjugated diene monomer and allowing polymerization to occur until essentially no free monomer is present; thereafter
   (d) charging a mixture of monovinylaromatic monomer and conjugated diene monomer and allowing polymerization to occur until essentially no free monomer is present; thereafter
   (e) charging a conjugated diene monomer and allowing essentially complete polymerization to occur until essentially no free monomer is present; and thereafter
   (f) charging the reaction mixture with a coupling agent, wherein only two initiator charges are present and are performed as stated in steps (a) and (b).

2. A method according to claim 1 wherein each said monovinylaromatic monomer contains 8 to 12 carbon atoms and each said conjugated diene contains 4 to 6 carbon atoms, said monomers being added in a ratio of about 55 to about 95 weight percent monovinylaromatic monomer and about 5 to about 45 weight percent conjugated diene monomer, said ratio referring to the amounts of monomers added as a sum of all of the steps, thus giving a resinous tapered block copolymer.

3. A method according to claim 1 wherein each said monovinylaromatic monomer contains 8 to 12 carbon atoms and each said conjugated diene contains 4 to 6 carbon atoms, said monomers being added in a ratio of about 60 to about 90 weight percent monovinylaromatic monomer and about 10 to about 40 weight percent conjugated diene monomer, said ratio referring to the amounts of monomers added as a sum of all of the steps, thus giving a resinous tapered block copolymer.

4. A method according to claim 1 wherein each said monovinylaromatic monomer contains 8 to 12 carbon atoms and each said conjugated diene contains 4 to 6 carbon atoms, said monomers being added in a ratio of about 65 to about 85 weight percent monovinylaromatic monomer and about 15 to about 35 weight percent conjugated diene monomer, said ratio referring to the amounts of monomers added as a sum of all of the steps, thus giving a resinous tapered block copolymer.

5. A method according to claim 1 wherein the weight ratio of the amounts of said monovinylaromatic monomer and said conjugated diene monomer in each of steps (c) and (d) is within the range of about 1:0.63 to about 1:2.

6. A method according to claim 1 wherein the weight ratio of the amounts of said monovinylaromatic monomer and said conjugated diene monomer in each of steps (c) and (d) is within the range of about 1:0.67 to about 1:1.8.

7. A method according to claim 1 wherein the weight ratio of the amounts of said monovinylaromatic monomer and said conjugated diene monomer in each of steps (c) and (d) is within the range of about 1:0.8 to about 1:1.5.

8. A method according to claim 1 wherein said monovinylaromatic monomer charged in step (a) is from about 27 to about 80 weight percent of the total monovinylaromatic monomer charged in said method; and
   wherein said monovinylaromatic monomer charged in step (b) is from about 7 to about 33 weight percent of the total monovinylaromatic monomer charged in said method; and
   wherein said monovinylaromatic monomer charged in step (c) is from about 5 to about 47 weight percent of the total monovinylaromatic monomer charged in said method, and
   wherein said monovinylaromatic monomer charged in step (d) is from about 5 to about 47 weight percent of the total monovinylaromatic monomer charged in said method.

9. A method according to claim 1 wherein said monovinylaromatic monomer charged in step (a) is from about 40 to about 67 weight percent of the total monovinylaromatic monomer charged in said method; and wherein said monovinylaromatic monomer charged in step (b) is from about 13 to about 27 weight percent of the total monovinylaromatic monomer charged in said method; and wherein said monovinylaromatic monomer charged in step (c) is from about 8 to about 33 weight percent of the total monovinylaromatic monomer charged in said method, and wherein said monovinylaromatic monomer charged in step (d) is from about 8 to about 33 weight percent of the total monovinylaromatic monomer charged in said method.

10. A method according to claim 1 wherein said monovinylaromatic monomer charged in step (a) is from about 47 to about 60 weight percent of the total monovinylaromatic monomer charged in said method; and wherein said monovinylaromatic monomer charged in step (b) is from about 16 to about 24 weight percent of the total monovinylaromatic monomer charged in said method; and wherein said monovinylaromatic monomer charged in step (c) is from about 11 to about 29 weight percent of the total monovinylaromatic monomer charged in said method, and wherein said monovinylaromatic monomer charged in step (d) is from about 11 to about 29 weight percent of the total monovinylaromatic monomer charged in said method.

11. A method according to claim 1 wherein said initiator in steps (a) and (b) is charged in amounts effective to provide polymer having a melt flow in the range from about 2 to about 50 g/10 min.

12. A method according to claim 1 wherein said initiator in steps (a) and (b) is charged in amounts effective to provide proportionate amounts of polymeric species in said polymer such that articles made from said polymer have improved environmental stress crack resistance.

13. A method according to claim 1 wherein said initiator in steps (a) and (b) is charged in amounts effective to provide proportionate amounts of polymeric species in said polymer such that articles made from blends of said polymer with polymers of styrene have improved environmental stress crack resistance.

14. A method according to claim 1 wherein said initiator in step (b) is present in an amount from about 0.25 to about 300 times, based on weight, the amount of initiator in step (a).

15. A method according to claim 1 wherein said initiator in step (b) is present in an amount at least equal to the amount of said initiator in step (a).

16. A method according to claim 1 wherein said initiator in step (b) is present in an amount from about 1 to about 300 times, based on weight, the amount of initiator in step (a).

17. A method according to claim 1 wherein said conjugated diene monomer is 1,3-butadtene, said monovinylaromatic monomer is styrene, said organomonoalkali metal initiator is n-butyllithium, said randomizer is chosen from the group of tetrahydrofuran and diethyl ether, and said coupling agent is epoxidized vegetable oil.

18. A method according to claim 1 wherein the polymerization is carried out in a hydrocarbon diluent;

wherein said polymerization is carried out in a substantial absence of oxygen and water at temperatures ranging from about −10° C. to about 150° C.;

wherein, after said coupling agent reacts with products of said polymerization, the system is treated with a terminating agent and a stabilizer; and wherein, after termination with said terminating agents, any remaining hydrocarbon diluent is flashed off.

19. Polymodal copolymers produced in accordance with the method of claim 1.

20. Articles made from the copolymer of claim 19.

21. A polymodal coupled resinous block copolymer of a monovinyl aromatic compound and a conjugated diene, said copolymer having polymer chains which result from coupling S—S—B/S—B/S—B—Li
S—B/S—B/S—B—Li wherein
S = monovinylaromatic block
B = conjugated diene block
B/S = tapered block of B and S
Li = living polymer site or coupling site.

22. A copolymer as recited in claim 21 having from about 55 to about 95 weight percent polymerized monovinylaromatic compound based on total weight of monomers in said copolymer.

23. A copolymer as recited in claim 21 having from about 60 to about 90 weight percent polymerized monovinylaromatic compound based on total weight of monomers in said copolymer.

24. A copolymer as recited in claim 21 having from about 65 to about 85 weight percent polymerized monovinylaromatic compound based on total weight of monomers in said copolymer.

25. Articles made from the copolymer of claim 21.

* * * * *